United States Patent Office 2,838,233
Patented June 10, 1958

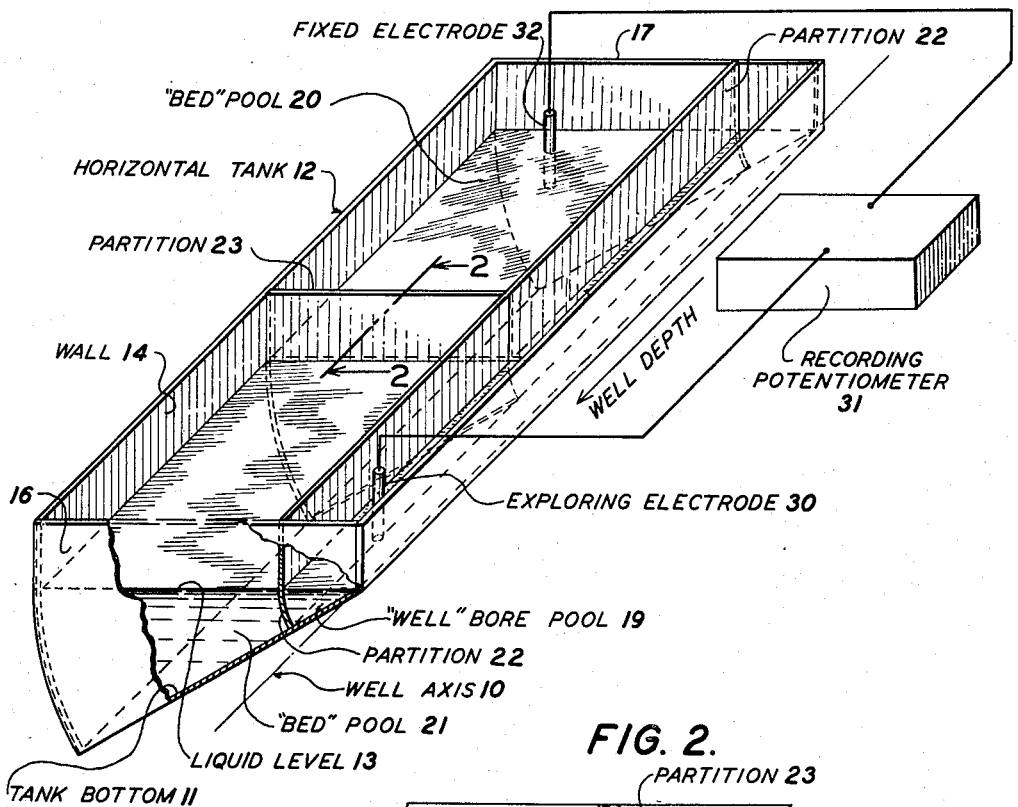
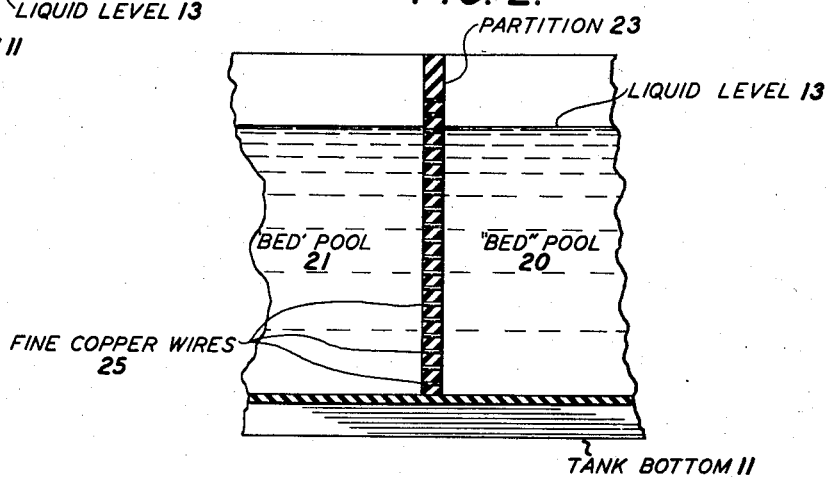

2,838,233
ELECTRICAL ANALOGUES

Allen D. Garrison, La Jolla, Calif., assignor to Texaco Development Corporation, New York, N. Y., a corporation of Delaware Continuation of application Serial No. 98,666, June 13, 1949. This application April 5, 1956, Serial No. 576,428

7 Claims. (Cl. 235—61)

This invention relates to potentiometric models employed for the solution of problems encountered in the investigation of electrical, magnetic, mechanical, hydraulic, and thermal systems, and is concerned particularly with establishing and maintaining required potential differences across conductive barriers employed to separate adjacent pools of electrolyte in such models. The invention provides methods and apparatus to this end.

This application is a continuation of my copending application Serial No. 98,666, now abandoned, which was filed on June 13, 1949.

As disclosed in Patent No. 2,569,816 which issued on October 2, 1951, in the name of Burton D. Lee, Patent No. 2,569,510 which issued on October 2, 1951, in the name of Alexander Wolf, and Patent No. 2,547,950 which issued on April 10, 1951, to Herzog and Lee, a number of mechanical, magnetic, electrical and thermal systems obey Laplace's equation, at least approximately. By way of example, there is a complete analogy between the flow of an uncompressed fluid in a porous medium and the flow of electricity in a conductor. This analogy has been applied to the solution of oil and gas field problems through the construction of electrical analogues. These employ a conductive model, say a pool of electrolyte the shape of which is analogous to that of the petroleum producing structure undergoing investigation. If the structure is composed of rocks of different permeability and the boundaries between these rocks is known, a conductive barrier may be introduced into the model to simulate the boundary, and the difference in permeability simulated by employing pools of electrolyte having different resistivities corresponding respectively to the permeabilities of the rocks represented. Wells in the structure are represented by electrodes projecting into the pool. In the case of a gas condensate field being subjected to a cycling operation, some of the electrodes may represent injection wells and others extraction wells. Exploration of the potential gradients set up in the pool by the electrodes permits accurate mapping of the "invasion front" of the dry gas being pumped into the injection wells to displace wet gas removed through the extraction wells.

Similar analogies may be drawn between the flow of electricity in a pool of electrolyte and the conduction of heat in solid thermal conductors, the distribution of mechanical stresses in a loaded structure, the distribution of flux in electrical, magnetic and electromagnetic fields and the distribution of potentials in a well bore and its surrounding formations in the earth. So the potentiometric model or analogue technique is applicable to problems arising in all of the foregoing cases, examples being the design of hydraulic structures such as dams, the design of electrical apparatus including condensers, insulators, conductive terminals and electrical discharge devices such as vacuum tubes, radiation counters, electrostatic lenses, etc., and the investigation of the fundamentals of electrical logging of oil wells and the like.

Electrical logging is much employed in oil and gas fields to investigate the nature and thickness of the various earth formations penetrated by wells. In electrical logging, currents are set up in the mud or liquid in the well bore and in the formations and the effects of these currents are measured with one or more exploring electrodes which are drawn through the bore, observed potentials being plotted against well depth. In this fashion both "self potential" and "resistivity" logs are obtained and yield valuable information with respect to subsurface geology. The interpretation of "self potential" and "resistivity" logs obtained in such wells depends upon a number of theoretical considerations which cannot be verified in logging of actual wells because of the large number of unknowns and the complexities involved due to the fact that ordinarily a well penetrates a large number of beds or formations. An electrical analogue employing a potentiometric model of a well and its surrounding formations has been developed by Herzog and Lee and is disclosed in the aforementioned Patent No. 2,547,950. By means of this analogue various theories and hypotheses employed in well log interpretation may be subjected to check.

The technique developed by Herzog and Lee employs a potentiometric model with the axis of the "well bore" lying horizontally. The well bore is represented by a long narrow compartment, and the beds penetrated by the wells are represented by a series of compartments adjoining the side of the well bore compartment. The side of the well bore compartment and the partitions between the compartments representing the beds are impervious upright walls or barriers. Each compartment contains a pool of electrolyte (say a water solution of a salt) having a resistivity corresponding to that of the body which it represents. Thus the pool in the well bore compartment has its resistivity adjusted to correspond to the resistivity of the mud in the actual bore hole represented, and the pools in the respective "bed" compartments have their resistivities adjusted to correspond to the beds represented.

The walls or partitions which separate the "bed" compartments from each other and the "well bore" compartment must be impervious to the electrolyte, and means must be provided for transmitting current across each partition substantially throughout its length but incapable of transmitting current lengthwise of the partition. One way of accomplishing this result is to hand a series of fine wire U's over a partition of insulating material, the U's being spaced close together but not touching. Each U dips into the pools of electrolyte on opposite sides of the partition and is capable of transmitting current from one pool to the other across the partition, but there is no conduction lengthwise across the partition. Another way of accomplishing this result is to employ a partition of nonconductive plastic material having a grid of conductive wires embedded in it, each wire running directly across the partition and insulated from the other wires. In short, the partition is a conductor in one direction in space only, i. e., normal to its own surface.

A resistivity log is obtained by energizing the model just described with electric current, just as in resistivity logging of an actual well, and exploring the "well bore" compartment by passing one or more measuring electrodes along it, to simulate the exploration in an actual well bore.

In making a "self potential" log of a well, a movable electrode connected to the end of an insulated cable is passed along the well bore, which is filled with drilling mud. The upper end of the cable is connected to a recording potentiometer. The other terminal of the potentiometer is connected to a second electrode grounded at a fixed point on the surface, and the potential at this point is arbitrarily assumed to be zero. Therefore, for each position of the movable electrode in the bore, the potentiometer records the relative potential. These relative potentials are plotted against well depth, usually by direct recording and the result is the "self potential" log.

The "self potential" log of a well is affected by various factors, not all of which are as yet clearly understood. However, it is generally accepted that the "self potential" is caused by voltage differences which exist at the boundaries or interfaces between adjoining beds and between the beds and the fluid in the well. These voltages in turn depend on the materials which compose the beds and on the fluids contained in the well and in the beds, as well as upon pressure differences between the fluid in the well and those in the beds. For practical purposes, the aforementioned factors may be grouped into a series of potential differences distributed along the boundaries (a) between beds and (b) between the beds and the well.

These differences can be represented in the well model described by employing barriers which set up potential differences between adjacent pools, although in addition the resistivities of the several pools have to be adjusted as explained previously. One way to set up the required potential difference across the barrier is described by Lee and Herzog in their aforementioned application. They employ an insulating partition having a great number of wires passing through it, as already described, but the several wires are built of two different conductors. Thus each wire may have a right half of iron welded to a left half of copper so that a contact voltage is produced at the junction, the junctions being embedded in the insulator out of which the barrier is built. In effect, the barrier is a wall with a large number of built-in batteries or galvanic piles. By selecting different metal couples, different voltage differences can be set up through the barrier.

The instant invention is directed to a different way of setting up the required potential difference across a barrier in a potentiometric model between two pools of electrolyte. Thus the invention contemplates developing a fixed but adjustable potential across a barrier separating two pools of electrolyte in a potential model by disposing a solid electrical conductor across the barrier and carrying on an electrochemical oxidation=reduction reaction (as in an oxidation=reduction cell) in one of the pools and controlling the action by controlling ion activity in the pool.

If desired, the metal of the conductor can be the same as that of the ions in the pool, an example being two pools of aqueous copper sulphate solution separated physically by a barrier but connected electrically by a copper conductor as in a concentration cell.

The potential of the end of a copper wire relative to that of a copper-containing electrolyte is a function of the activity of the copper ions (Cu) in the electrolyte. If the activity of the Cu-ions is increased by adding more copper salt to the solution, the copper wire in contact with the solution becomes more positive. The change in the voltage of the wire, when the activity is changed from $A_1$ to $A_2$ can be calculated by the Nernst equation:

$$\text{Change in voltage} = \frac{RT}{nF} \ln \frac{A_2}{A_1}$$

wherein, R is the molar gas constant in Joules; T the kelvin temperature; n the valence of the ion in question; F the Faraday in coulombs.

For a temperature of 25° C., and using copper which has n equal 2, the equation becomes:

$$\text{Volts} = .0296 \log A_2/A_1$$

Thus, if the activity of the copper ions in an electrolyte pool on the right hand side of a barrier composed of insulating material with a number of copper wires running through it is, say, .01 mol/liter, and the activity of the ions in another electrolyte pool on the left is .001 mol/liter, then the electrolyte in the right hand pool will be .0296 volts more negative than the electrolyte immediately across the barrier in the left hand pool. With uniform electrolyte activity this same potential difference will exist between opposite sides of the barrier over its entire extent.

The above-described potential difference can be controlled by adjustments in the difference in copper ion activity. If it is desired to make the potential difference very large, this may be accomplished by putting a material (say ammonia) into one of the electrolytes which draws the copper ion into a weakly ionized complex.

Independent control over both the potential across the barrier and the electrical conductivity on either side can be obtained by adding an ionizable salt to the electrolyte where it is desirable to increase the conductivity, making the choice of salt such that its ions are inert to the copper electrode and do not alter the copper ion activity. For example, if the copper ion activity has been adjusted by adding copper sulfate to the water, and it is necessary to make the solution a better conductor, potassium chloride may be used for the purpose. The voltage of the end of the copper wire which contacts this solution will depend on the activity of the copper ions only, and, within reasonable limits, will not be influenced by the potassium and chloride ions.

The wires in the partition may consist of some metal other than copper, such as zinc, or cadmium, and the electrolytes may be adjusted by varying the activity of zinc ions or cadmium ions respectively.

Two barriers or partitions such as those described can be used to contact the same solution and yet be made independently variable. One partition may be traversed by copper wires, and the other by silver wires. In such case, the solution contains, for example, copper sulfate to determine the copper wire potential and potassium chloride to determine the silver potential, since silver chloride will precipitate on the ends of the silver wires. The overall conductivity can be altered by sodium nitrate. The sodium nitrate adds to the conductivity of the electrolyte, but it does not alter the potential of the copper conductors on the one hand, or the silver conductors on the other.

In short, the aspect of my invention just described contemplates developing a fixed, but adjustable, potential across a barrier separating two pools of electrolyte in a potentiometric model by employing a metal conductor across the barrier from pool to pool, and introducing ions of the same metal into the pools, and maintaining different ionic activities in the two pools. The invention contemplates adjusting the potential difference between the pools by direct adjustment of the ion concentration as well as by introducing into at least one of the pools a substance which draws the ions into a weakly ionized complex. Moreover, the invention contemplates independent control over both the potential across the barrier and the conductivity of the pools on either side by adding to either or both pools an ionizable salt that produces ions that are inert to the metal conductor and do not alter appreciably the activities of the metal ions.

These and other aspects of my invention will be understood more thoroughly in the light of the following detailed description, taken in conjunction with the accompanying drawing in which:

Fig. 1 is a diagram, illustrating by means of a perspective view partly in section, a potentiometric model of a well penetrating two different earth strata; and Fig. 2 is a fragmentary section taken along the line 2—2 of Fig. 1 and showing two electrolyte pools separated by a conductive barrier.

All the phenomena which occur in a well bore are symmetrical with respect to the axis of the well. Because of this symmetry, a well with its surrounding formations can be represented by a wedge defined by two planes which contain the axis of the well and cross each other on that axis. Preferably the other wall of the wedge is a portion of a cylinder the axis of which is that of the well. The wedge may be the quadrant of a cylinder having the "well axis" as its axis, or a smaller "slice" may be used, as shown in Fig. 1.

To facilitate the use of liquids in the model of Fig. 1, its axis (the "well axis" 10) is disposed horizontally instead of vertically, with the bottom 11 of its wedge-shaped tank 12 sloping downward away from the axis. The liquid in the tank thus assumes a wedge-shape, the bottom defining one face and the liquid level 13 the other. The tank has a curved wall 14 on its deep side, the well axis being that of the curvature. This wall is fastened to the bottom and to pie-shaped end walls 16, 17 which help to retain pools 19, 20, 21 of electrolyte. A partition 22 running in the same direction as the wall 14 and curved around the same axis separates a part of the slice near the well axis from the rest of the slice. Thus the pool 19 near the axis represents the well bore, while the wider and deeper pools 20, 21 represent respectively beds penetrated by the well. The "bed" pools are separated from each other by a vertical pie-shaped partition 23, which is parallel to the end walls. The liquid level in the "well bore" pool 19 and the "bed" pools is the same and rises to the well axis.

The walls and bottom of the tank are of insulating material. The partitions 22, 23 must have electrical properties appropriate to the problem being studied. In other words, means must be provided for conducting electricity through or over these barriers at a plurality of points along them, but the barriers should not be conductive longitudinally. Fig. 2 illustrates suitable partition construction. Thus the partition 23 is impervious to liquid and keeps the two bed pools separate. It is composed of insulating plastic, but a multitude of fine copper wires 25 passes through the partition over substantially its entire area, i. e. the rows of wires which make up the grid extend longitudinally as well as vertically. The wires are insulated from each other, so that effectively the partition is a conductor only in the direction normal to its major surfaces. The partition 22 which separates the "bed" pools from the "well bore" pool is of similar construction.

The three electrolyte pools of the model have resistivities corresponding respectively to the bodies they represent, i. e. the two beds and the mud in the well bore. A potential difference is maintained through the partition 22 which separates the well bore pool from the bed pools and another potential difference is maintained through the partition 23 which separates the two bed pools. These potential differences simulate those occurring at the boundaries in the well represented by the partitions. The resistivities of the pools and the potential differences through the barriers are established in accordance with the invention. Thus all three pools are aqueous solutions containing copper sulfate, the copper concentrations in the pools being adjusted as already described to give the required potential difference across the barriers. If the solutions thus prepared do not satisfy the resistivity requirements of the bodies they represent, resistivities are adjusted. Increase in resistivity of a pool is obtained by adding to a pool a material, for example ammonia, in the case of copper, which binds the copper ion into a weakly ionized complex. Reduction in resistivity of a pool is obtained by adding a salt, say potassium chloride in the case of copper, which increases conductivity without, within reasonable limits, affecting the activities of the copper ions.

If, in order to satisfy the requirements of the particular well being studied with the aid of the potentiometric model, it is necessary that the potentials of two barriers contacting the same electrolyte pool be independently variable, it is necessary to make the conductors associated with the two barriers of different metals. Take the case of the bed pool 21 which is in contact with partition 23 and with part of the partition 22. The latter two may be made independently variable by employing silver wires in one and copper in the other, with the pool containing copper sulfate and potassium chloride. Silver chloride will precipitate on the ends of the silver wires in contact with the pool and control the potential difference through the barrier containing these wires. If necessary, the overall conductivity of the pool is adjusted by adding sodium nitrate, or some other ionizable salt which increases conductivity without affecting the activity of the copper or the silver conductors.

To simulate a self potential log with the model of Fig. 1, an exploring electrode 30 is moved along the pool 19 (representing the mud or liquid in the well bore). The exploring electrode is connected through a recording potentiometer 31 to a fixed electrode 32 disposed in the pool 20 at a point corresponding to the earth surface. The potentials set up between the two electrodes are measured at a plurality of points along the pool 19 and plotted against the pool length, which represents depth in the well bore. The length of the "bed" pools represent, of course, bed thicknesses. If desired, any number of "bed" pools may be built into the model of Fig. 1, and separated by partitions with current conductive means, resistivities in the individual pools and potential differences across the partitions being adjusted as already described.

The control of potential difference across a barrier through adjustment of ion activity by the formation of complexes has been described with reference to copper and the copper-ammonium complex. There are numerous other examples.

With two pools of silver nitrate electrolyte separated by a barrier provided with a silver conductor, potential across the barrier may be changed by adding potassium cyanide to one of the pools, thus reducing silver ion activity in that pool through the formation of the complex $KAg(CN)_2$.

The complex ammonium chloro plumbate $(NH_4)_2PbCl_6$ is weakly ionized and its formation in an electrolyte pool will reduce lead ion activity in the pool and thus alter potential across the barrier separating that pool from another. The formation of lead silico fluoride in a pool of electrolyte from a more highly ionized lead salt will have a similar effect.

The addition of sodium hexametaphosphate to a cadmium chloride electrolyte produces a complex and reduces cadmium ion activity. A practical application of this complex in a potentiometric model having more than one barrier is as follows:

(1) Pool of aqueous cadmium chloride solution;
(2) Barrier provided with cadmium conductors;
(3) Pool of aqueous cadmium chloride solution to which sodium hexametaphosphate is added;
(4) Barrier provided with gold conductors;
(5) Pool of aqueous cadmium chloride solution.

The invention may be practiced without relying upon electrolytic action between the metal of the conductor and the same metal in ion form in the electrolyte. In other words, the conductor may be inert, in the sense that this term is usually employed in discussions of electrolytic cells, while the potential difference is developed by an electrolytic oxidation-reduction reaction within the pool. For example, the conductor across the barrier may be platinum with potential development due to the conversion of ferric to ferrous ions, or of ferrous to ferric ions in the pool. To consider a specific case, the first compartment of a potentiometric model may contain a pool of aqueous copper sulphate solution. The second electrolyte pool contains copper sulphate in very small concentration and ferrous and ferric sulphates in greater concentrations. The barrier separating the first two pools is crossed by a copper conductor. The third electrolyte pool contains potassium chloride plus thallic and thallous nitrates and the barrier which separates the second and third pools is crossed by an inert gold conductor. In the model just described, current flow is from the first to the second and thence to the third pools under the influence of "self potentials" developed between the pools. Copper ion tends to plate to copper on the conductor in the first pool and copper from the conductor tends to go into solution and become ionized in the second pool. However, ferrous ion tends to oxidize to ferric ion at the copper conductor in the first pool, thus inhibiting the solution of the copper while generating ferric ion, with resultant production of a potential across the first barrier. At the second barrier, which separates the second and third pools and is crossed by the gold conductor, ferric ion formed in the second pool is reduced to ferrous ion, while in the third pool thallous ion is oxidized at the gold conductor to thallic ion, with result production of a potential over the second barrier.

The potential to be developed across a barrier in any given instance may be determined accurately from a table of standard oxidation-reduction potentials. Consider a potentiometric model having a first pool of silver nitrate and a second pool containing acidified stannous and stannic chloride solutions, the two being separated by a barrier provided with a silver conductor. Unit activities and a temperature of 25° C. are assumed.

The value of the oxidation-reduction potential in volts, referred to the hydrogen-hydrogen ion couple as zero for the reaction $Sn^{++}/Sn^{++++}$ is $+0.13$. The corresponding value for the $Ag/Ag+$ reaction is $+0.798$, so that the voltage difference across the barrier under the conditions assumed is 0.798 minus 0.13 or 0.668 volts.

Some silver will go into solution in the second pool but the concentration is small, and may be derived as follows:

$$E = .06 \log \frac{1}{Ag+}$$

where E is the voltage across the barrier, i. e. 0.668 and $Ag+$ is the molal concentration of silver required for equilibrium in the second bath.

Substituting the value of .668 in the equation and solving for $Ag+$, it is found that this concentration is $10^{-11.1}$. In short, only a very small amount of silver will dissolve from the conductor into the second bath, whereupon solution will cease but the potential difference across the barrier will continue to be maintained.

To take a second example, let the first pool contain cupric ion ($Cu^{++}$) with titanous ($Ti^{++}$) and titanic ($Ti^{+++}$) ions in the second bath, the conductor through the barrier between baths being copper. Unit activities and a temperature of 25° C. are again assumed, and under these conditions the oxidation-reduction potential for $Ti^{++}/Ti^{+++}$ is $-.37$ while that for $Cu/Cu^{++}$ is $+.344$. The voltage across the barrier under the conditions assumed is the sum of .344 and .37 or .714. The equilibrium concentration in mols of copper for the second pool is derived from $$.714 = \frac{.06 \log}{2} \frac{1}{Cu++}$$

i. e., $$Cu++ = 10^{-23.8}$$

The application of the invention is not limited to potentiometric models of wells, but may be used in any potentiometric model in which it is desired to establish a potential difference across a barrier separating pools of electrolyte. Thus it can be used in potentiometric models of oil or gas structures, dams, solid conductors of heat, and models representing electrical discharge devices, condensers, insulators, etc.

I claim:

1. In a process for simultaing in a potentiometric model the conditions existing in a physical system in which a difference analogous to a difference in an electrical potential exists at a boundary between two parts of the system, the improvement which comprises separating two parts of the model corresponding to the two parts of the system with a nonconductive barrier corresponding in shape and location to the boundary, disposing pools of electrolyte corresponding respectively to the two parts of the system in contact with the barrier on opposite sides of it, connecting the pools with a metallic conductor, and producing potential difference between the two pools by galvanic action including electrochemical equilibrium at each contact between metallic conductor and pool of electrolyte, the two pools both containing ions corresponding to the metal of the conductor but in different concentrations so that the two pools and the metallic conductor act as a concentration cell.

2. In a process for simulating in a potentiometric model the conditions existing in a physical system in which a difference analogous to a difference in an electrical potential exists at a boundary between two parts of the system, the improvement which comprises separating two parts of the model corresponding to the two parts of the system with a nonconductive barrier corresponding in shape and location to the boundary, disposing pools of electrolyte corresponding respectively to the two parts of the system in contact with the barrier on opposite sides of it, connecting the pools with a metallic conductor, and producing potential difference between the two pools by galvanic action including electrochemical equilibrium at each contact between metallic conductor and pool of electrolyte, the two pools both containing ions corresponding to the metal of the conductor and a substance being introduced into at least one of the pools which forms a weakly ionized complex of the ions of the metal, thereby producing a different concentration of the ions of the metal in the two pools and causing the two pools and the metal conductor to act as a concentration cell and produce the potential difference between the pools.

3. In a process for simulating in a potentiometric model the conditions existing in a physical system in which a difference analogous to a difference in an electrical potential exists at a boundary between two parts of the system, the improvement which comprises separating two parts of the model corresponding to the two parts of the system with a nonconductive barrier corresponding in shape and location to the boundary, disposing pools of electrolyte corresponding respectively to the two parts of the system in contact with the barrier on opposite sides of it, connecting the pools with a metallic conductor, and producing potential difference between the two pools by galvanic action including electrochemical equilibrium at each contact between metallic conductor and pool of electrolyte, both pools containing ions corresponding to the metal of the conductor but in different concentrations so that the two pools and the metallic conductor act as a concentration cell and produce the potential difference between the pools, the conductivity of at least one of the pools being changed by introducing into it an ionizable salt that produces ions that are inert to the metal conductor and do not alter appreciably the electrochemical activity of the ions of the metal.

4. In a process for simulating in a potentiometric model the conditions existing in a physical system in which a difference analogous to a difference in an electrical potential exists at a boundary between two parts of the system, the improvement which comprises separating two parts of the model corresponding to the two parts of the system with a nonconductive barrier corresponding in shape and location to the boundary, disposing pools of electrolyte corresponding respectively to the two parts of the system in contact with the barrier on opposite sides of it, connecting the pools with a metallic conductor, introducing ions into one of the pools of electrolyte to make the composition of that pool different from the composition of the other pool, and to produce at the contact between that pool and the metallic conductor a voltage different from that existing at the contact between the conductor of the other pool, thereby producing potential difference between the two pools by galvanic action including electrochemical equilibrium at each contact between metallic conductor and pool of electrolyte, and introducing ions of a different kind into one of the pools to change the conductivity of the pool without affecting appreciably the activity of the ions which produce the potential difference between the pools.

5. In a process for simulating in a potentiometric model the conditions existing in a physical system in which a difference analogous to a difference in an electrical potential exists at a boundary between two parts of the system, the improvement which comprises separating two parts of the model corresponding to the two parts of the system with a nonconductive barrier corresponding in shape and location to the boundary, disposing pools of electrolyte corresponding respectively to the two parts of the system in contact with the barrier on opposite sides of it, connecting the pools with metallic conductor means with the individual metallic conductors which interconnect pools being composed of the same metal throughout the length of the conductor, and introducing ions into one of the pools of electrolyte to make the composition of that pool of electrolyte different from the composition of the other pool of electrolyte and producing at the contact between the pool to which the ions are introduced and the metallic conductor a voltage different from that existing at the contact between the metallic conductor and the other pool of electrolyte, thereby producing potential difference between the two pools by galvanic action including electrochemical equilibrium at each contact between metallic conductor and pool of electrolyte.

6. In a process for simulating in a potentiometric model the conditions existing in a physical system in which a difference analogous to a difference in an electrical potential exists at a boundary between two parts of the system, the improvement which comprises separating two parts of the model corresponding to the two parts of the system with a nonconductive barrier corresponding in shape and location to the boundary, disposing pools of electrolyte corresponding respectively to the two parts of the system in contact with the barrier on opposite sides of it, connecting the pools with a metallic conductor, and introducing ions into one of the pools of electrolyte to make the composition of that pool of electrolyte different from the composition of the other pool of electrolyte and producing at the contact between the pool to which the ions are introduced and the metallic conductor a voltage different from that existing at the contact between the metallic conductor and the other pool of electrolyte, thereby producing potential difference between the two pools by galvanic action including electrochemical equilibrium at each contact between metallic conductor and pool of electrolyte.

7. In a process for simulating in a potentiometric model the conditions existing in a physical system in which a difference analogous to a difference in an electrical potential exists at a boundary between two parts of the system, the improvement which comprises separating two parts of the model corresponding to the two parts of the system with a nonconductive barrier corresponding in shape and location to the boundary, disposing pools of electrolyte corresponding respectively to the two parts of the system in contact with the barrier on opposite sides of it, connecting the pools with a metallic conductor, introducing ions into one of the pools of electrolyte to make the composition of that pool of electrolyte different from the composition of the other pool of electrolyte and carrying out an oxidation-reduction reaction in at least one of the pools so that the two pools and the metallic conductor act as an electrochemical oxidation-reduction cell and produce at the contact between the pool to which the ions are introduced and the conductor a voltage different from that existing at the contact between the conductor and the other pool, thereby producing potential difference between the two pools by galvanic action including electrochemical equilibrium at each contact between metallic conductor and pool of electrolyte.

References Cited in the file of this patent

UNITED STATES PATENTS 2,547,950    Lee et al. _____ Apr. 10, 1951

OTHER REFERENCES

"Electrochemistry" by Creightion, vol. 1, 4th edition (1943), pp. 166, 199–201, 227.

Bersworth Chem. Co., "Versene" Tech Bull. No. 1, Jan. 14, 1949, p. 10.